(12) United States Patent
Krishnamurthy et al.

(10) Patent No.: US 7,979,413 B2
(45) Date of Patent: Jul. 12, 2011

(54) AUTOMATIC GENERATION OF EMBEDDED SIGNATURES FOR DUPLICATE DETECTION ON A PUBLIC NETWORK

(75) Inventors: Balachander Krishnamurthy, New York, NY (US); Saurabh Kumar, Richmond (CA); Lakshminarayanan Subramanian, New York, NY (US)

(73) Assignees: AT&T Intellectual Property l, L.P., Atlanta, GA (US); New York University, New York, NY (US)

( * ) Notice: Subject to any disclaimer, the term of this patent is extended or adjusted under 35 U.S.C. 154(b) by 455 days.

(21) Appl. No.: 12/156,370

(22) Filed: May 30, 2008

(65) Prior Publication Data

US 2009/0299994 A1 Dec. 3, 2009

(51) Int. Cl.
*G06F 7/00* (2006.01)
*G06F 17/30* (2006.01)

(52) U.S. Cl. ........ 707/706; 707/750; 707/758; 707/770; 715/209; 715/234; 715/258

(58) Field of Classification Search .................. 707/706, 707/750, 758, 770; 715/209, 234, 258
See application file for complete search history.

(56) References Cited

U.S. PATENT DOCUMENTS

| 5,081,608 | A | * | 1/1992 | Tamura et al. ................. 707/758 |
| 5,982,956 | A | * | 11/1999 | Lahmi ............................ 382/306 |
| 6,470,307 | B1 | * | 10/2002 | Turney .................. 707/E17.058 |
| 6,820,237 | B1 | * | 11/2004 | Abu-Hakima et al. ....... 715/210 |
| 7,184,570 | B2 | | 2/2007 | Rhoads |
| 7,296,089 | B2 | * | 11/2007 | Krishnamurthy et al. ..................... 707/E17.119 |
| 7,313,251 | B2 | | 12/2007 | Rhoads |
| 7,369,677 | B2 | | 5/2008 | Petrovic et al. |
| 7,369,678 | B2 | | 5/2008 | Rhoads |
| 7,672,971 | B2 | * | 3/2010 | Betz et al. ...................... 707/748 |
| 7,725,475 | B1 | * | 5/2010 | Alspector et al. ............. 707/758 |
| 7,801,893 | B2 | * | 9/2010 | Gulli' et al. .................... 707/737 |
| 7,853,554 | B2 | * | 12/2010 | Wan .............................. 707/758 |
| 2002/0023058 | A1 | * | 2/2002 | Taniguchi et al. .............. 705/57 |
| 2003/0154381 | A1 | * | 8/2003 | Ouye et al. .................... 713/182 |
| 2004/0172394 | A1 | * | 9/2004 | Smolsky ............................ 707/6 |
| 2005/0086205 | A1 | * | 4/2005 | Franciosa et al. ................. 707/3 |

(Continued)

OTHER PUBLICATIONS

Yookyung Jo, Carl Lagoze and C. Lee Giles—"Dectecting research Topics via the Correlation Between Graphics and Texts"—KDD'07 Aug. 12-15, 2007, San Jose, California, USA (ACM 2007) (pp. 1-10).*

(Continued)

*Primary Examiner* — John Breene
*Assistant Examiner* — Anh Ly

(57) ABSTRACT

In accordance with an aspect of the invention, a method and system are disclosed for constructing an embedded signature in order to facilitate post-facto detection of leakage of sensitive data. The leakage detection mechanism involves: 1) identifying at least one set of words in an electronic document containing sensitive data, the set of words having a low frequency of occurrence in a first collection of electronic documents; and, 2) transmitting a query to search a second collection of electronic documents for any electronic document that contains the set of words having a low frequency of occurrence. This leakage detection mechanism has at least the following advantages: a) it is tamper-resistant; b) it avoids the need to add a watermark to the sensitive data, c) it can be used to locate the sensitive data even if the leakage occurred before the embedded signature was ever identified; and, d) it can be used to detect an embedded signature regardless of whether the data is being presented statically or dynamically.

20 Claims, 3 Drawing Sheets

U.S. PATENT DOCUMENTS

| | | | |
|---|---|---|---|
| 2005/0120245 A1* | 6/2005 | Torisaki et al. | 713/201 |
| 2007/0174296 A1* | 7/2007 | Gibbs et al. | 707/10 |
| 2008/0028474 A1* | 1/2008 | Horne et al. | 726/27 |
| 2008/0228754 A1* | 9/2008 | Frank et al. | 707/5 |
| 2008/0243825 A1* | 10/2008 | Staddon et al. | 707/5 |

OTHER PUBLICATIONS

Deepayan Chakrabarti, Ravi Kumar and Kunal Punera—"Page-Level Template Detection via Isotonic Smoothing"—International World Wide Web Conference Committee (IW3C2), WWW. 2007, May 8-12, 2007, Banff, Alberta, Canada, Trac: Data Mining, session: Identifying Structure in Wed Pages (pp. 61-70).*

The Snow Home Page, downloaded from http://www.darkside.com.au/snow/index.html on May 29, 2008.

Brassil, J., et al., "Electronic Marking and Identification Techniques to Discourage Document Copying", IEEE Journal on Selected Areas in Communication, v. 13, No. 8, Oct. 1995.

Low, S.H., et al., "Document Marking and Identification Using Both Line and Word Shifting", INFOM'95, 14th Ann. Jt. Conf. IEEE Comp. & Comm. Soc. Apr. 2, 1995, p. 853.

* cited by examiner

AUTOMATIC GENERATION OF EMBEDDED SIGNATURES FOR DUPLICATE DETECTION ON A PUBLIC NETWORK

BACKGROUND OF THE INVENTION

The present invention relates generally to detection of documents that have been duplicated, perhaps without authority, and more particularly to post-facto duplication detection on a public network.

The need to analyze outgoing electronic traffic ("exit traffic analysis") has been underemphasized by the electronic networking community. Given the ever-growing number of sensitive-data leakage-incidents in enterprises, resulting in hundreds of millions of people being exposed to sensitive-information theft every year, there is a need to develop new exit traffic analysis techniques for data leakage detection and prevention.

Exit traffic analysis to detect data leakage is used in two different ways: a) to prevent leakage and b) to detect leakage after it has occurred ("post-facto"). An important goal of data leakage prevention is to develop a mechanism that will prevent any unauthorized user or process from improperly "leaking" any one of a given set of pre-identified sensitive documents. An important goal of post-facto leakage detection is to develop a mechanism that will determine which sensitive data has already leaked from the enterprise and is publicly available, for example, on the Internet.

The need for post-facto leakage detection—a major focus of this invention—is based on at least two observations. First, currently large amounts of sensitive information are publicly available in the Internet—often without the knowledge of the subject or owner of the sensitive information. For example, in March 2006, Gratis Internet Company collected personal data of 7 million Americans and sold it to third parties. With so much sensitive data available in the public domain, it would be advantageous for the subjects of the sensitive information to have a means for detecting which sensitive information is available and where it may be accessed. Second, given the wide range of leakage channels which are possible, some of which are outside the scope of any prevention strategy, no data leakage prevention strategy is perfect. This just heightens the need for post-facto leakage detection.

A common method for facilitating post-facto leakage detection is to use watermarking. Watermarking generally involves modifying a document in some way to make the document more distinguishable than it was before the watermarking. These modifications may either be visible or invisible to an observer. The watermark is then used to detect a document that has been improperly leaked.

While watermarking does help to distinguish a document, the technique has several weaknesses. First, since watermarking involves adding something to a document, this technique requires recognizing, before a leakage occurs, that a document needs to be watermarked. If the sensitivity of the information is only discovered after the leakage occurs, watermarking will not be an option for post-facto detection—the document will have been leaked before it could be watermarked. Second, watermarking is subject to tampering. A malicious party who seeks to make pirated information indistinguishable may be able to remove an added watermark. At the root of this second weakness is that a watermark is added onto an original document in someway. Since the watermark is a "separate entity" from the data comprising a document, it can be identified and removed, defeating its purpose.

Accordingly, an improved method—beyond traditional watermarking strategies—is needed for detecting the post-facto leakage of sensitive information into a public domain, such as the Internet. The method should be tamper-resistant, meaning that the sensitive electronic document should remain detectable even if it has been partially modified. Additionally, since leakage may occur before a watermark or other unique identifier may have been added to the document, it is advantageous to have a detection mechanism that does not require any modification to the sensitive document. Furthermore, since information in the public domain may be presented statically or dynamically, this method should be versatile in that it is able to detect the sensitive information whichever way it is being presented.

BRIEF SUMMARY OF THE INVENTION

In at least one embodiment, this invention is a tamper-resistant, post-facto technique for detecting leakage of sensitive data without requiring modification of the original electronic document containing the sensitive data. In one embodiment, the invention includes 1) identifying at least one set of words in a first electronic document, the set of words having a low frequency of occurrence in a first collection of electronic documents, for example, a frequency of occurrence that is below a predetermined threshold; and, 2) transmitting a query to search a second collection of electronic documents for documents that contain the set of words.

This post-facto detection technique does not require pre-leakage knowledge or designation of the data that is sensitive, since a unique embedded signature is identified from within the contents of the original document containing the sensitive data. The embedded signature is a set of words having a frequency of occurrence in a first collection of documents that is below a predetermined threshold. Use of a signature that is within the contents of the original document avoids any need to modify the original document by adding a watermark. The method is also tamper-resistant since any attempt to remove the embedded signature will likely result in a significant change to the original contents of the document so as to remove or significantly alter the sensitive data. This method is versatile in that detection of the rarely occurring set of words may be performed on either a statically or a dynamically presented document.

The set of words may appear in the electronic document in any pattern. Alternatively, the set of words may be consecutive words in the document.

Any number of words may be used as the set of words that comprise the signature. Alternatively, the set of words may preferably be between two and five words.

The predetermined threshold that is used to identify a low frequency of occurrence of a set of words may be determined as a function of historical data, research, or predictive models. Alternatively, the frequency of occurrence may be less than one time in every five hundred electronic documents. In another alternative, the frequency of occurrence may be less than one time in every thousand electronic documents.

The first collection of electronic documents, which is searched in order to determine a set of words in the first electronic document having a frequency of occurrence below a predetermined threshold, may be the same as the second collection of electronic documents, which is searched to find a duplicate or near duplicate of the first electronic document. Alternatively, the first collection of electronic documents may be different than the second collection of electronic documents.

The first collection of electronic documents may be a set of documents maintained by or available to the enterprise who owns the first electronic document. Alternatively, the first collection of electronic documents may be a set of documents maintained by or available to an enterprise other than the one who owns the first electronic document.

In a particular embodiment, the second collection of electronic documents may be a set of Internet web pages maintained by or available to an enterprise, such as an operator of an Internet search engine.

In another embodiment, a first party transmits to a second party that has access to the second collection of electronic documents, a query to search the second collection of electronic documents.

In a further embodiment, when at least two sets of consecutive words in the first electronic document are identified—each set having a low frequency of occurrence in the first collection of electronic documents—at least one of the sets of consecutive words is randomly selected as a signature. In a further embodiment, when at least three sets of consecutive words in the first electronic document are identified—each set having a low frequency of occurrence in the first collection of electronic documents—at least two of the sets of consecutive words are randomly selected as a signature.

In another embodiment, there is an apparatus comprising means for identifying at least one set of words in a first electronic document, said set of words having a frequency of occurrence in a first collection of electronic documents that is below a predetermined threshold; and means for transmitting a query to search a second collection of electronic documents for any electronic documents that contain the said set of words.

In another embodiment, there is a computer-readable storage medium encoded with computer executable instructions defining steps comprising identifying at least one set of words in a first electronic document, said set of words having a frequency of occurrence in a first collection of electronic documents that is below a predetermined threshold; and transmitting a query to search a second collection of electronic documents for any electronic documents that contain the said set of words.

These and other advantages of the invention will be apparent to those of ordinary skill in the art by reference to the following detailed description and the accompanying drawings.

DETAILED DESCRIPTION

Figure 1:
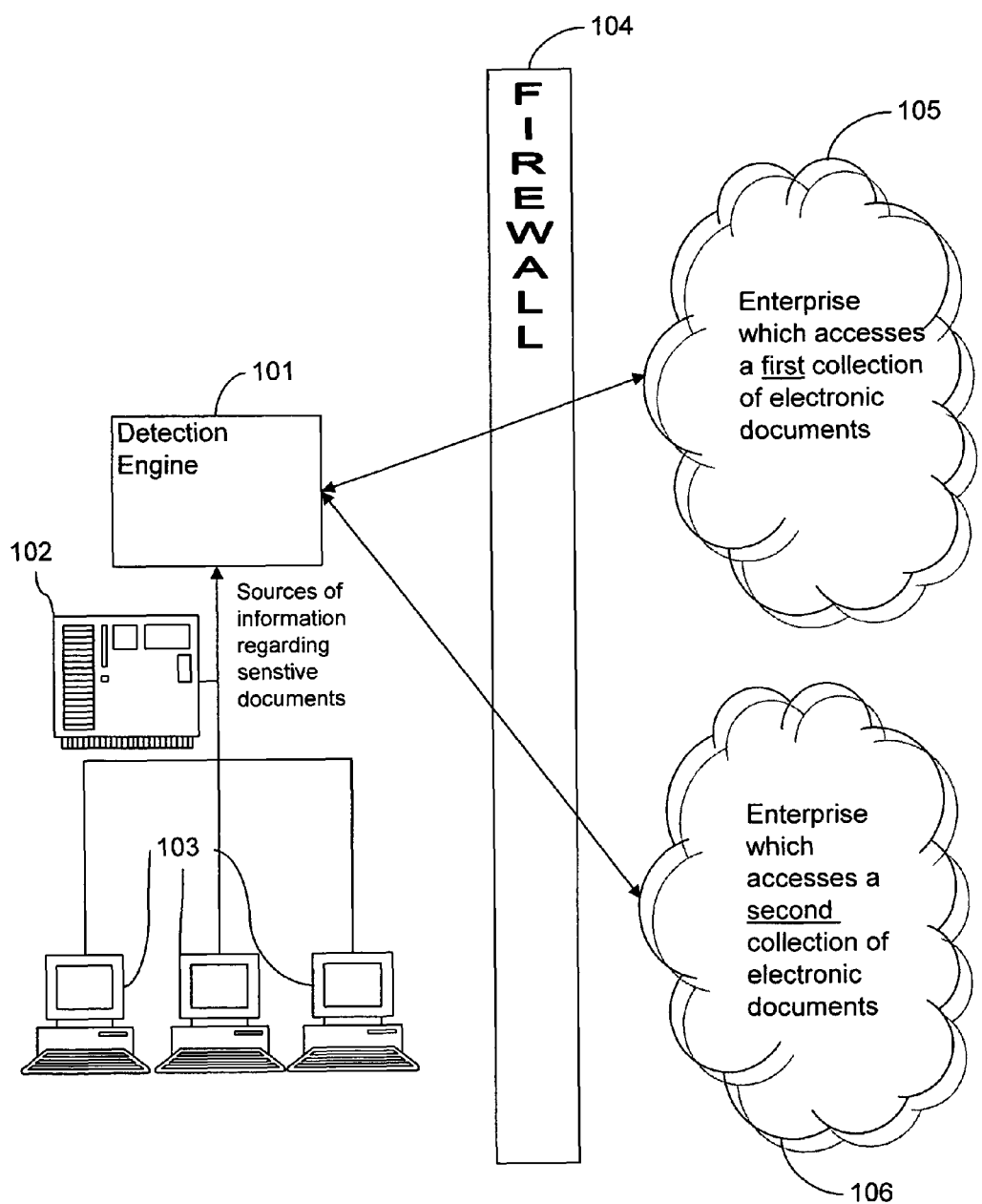
FIG. 1 is a schematic representation of a data detection mechanism according to an aspect of the invention.

Exit traffic analysis is used to detect data leakage in at least two different ways. The first use is to prevent data leakage. The second use is to detect leakage post-facto. An important goal of data leakage prevention is to prevent any unauthorized user or process from improperly transmitting ("leaking") any one of a given set of pre-identified sensitive documents. An important goal of post-facto leakage detection is to determine which documents or sensitive data has already leaked from an enterprise and is publicly available, for example, on the Internet. However, in accordance with one aspect of this invention, post-facto leakage detection, unlike data leakage prevention, is accomplished without identifying the sensitive data or document before the leakage takes place.

The need for post-facto leakage detection is based on at least two observations. First, there is a significant amount of sensitive information publicly available over the Internet, whether a subject of the sensitive information is aware of this fact or not. It would therefore be advantageous to have a means for detecting which information is available and where it is being presented. Second, even when a subject identifies certain information as sensitive before a leakage has occurred, no data leakage prevention strategy is perfect. There are a wide range of leakage channels which are possible, some of which are outside the scope of any prevention strategy. Therefore, it is inevitable that some sensitive information may leak into the public domain and it is important to identify that information post-leakage.

A common method for facilitating post-facto leakage detection is to use watermarking. Watermarking involves modifying a document in some way to make the document more distinguishable than it was before the watermarking. These modifications may either be visible or invisible to an observer. While watermarking does help to distinguish a document, it has several weaknesses. First, since watermarking involves adding data to a document, this technique requires recognizing, before a leakage occurs, that a document needs to be watermarked. If the sensitivity of the information is only discovered after the leakage occurs, watermarking will not be an option for post-facto detection. Second, watermarking is subject to tampering. A malicious party who seeks to conceal the pirated nature of a document may be able to remove an added watermark. At the root of this second weakness is that a watermark is added to an original document. Since the watermark is a "separate entity" from the original document, it is subject to detection and removal, defeating the purpose of the watermark.

An improved method—beyond standard watermarking techniques—is needed for detecting the post-facto leakage of sensitive information into a public domain, such as the Internet. The method should be tamper-resistent—i.e., the sensitive electronic document should remain detectable even if it has been partially modified. Additionally, since a leakage may occur before a watermark or other unique identifier may have been added to the document, it is advantageous to have a detection mechanism that does not require any modification to the sensitive document. Furthermore, since information in the public domain may be presented statically or dynamically, this method should be versatile in that it is able to detect the sensitive information whichever way it is being presented.

The invention is a tamper-resistant, post-facto technique for detecting leakage of sensitive data without requiring modification of the original electronic document containing the sensitive data. In one embodiment, the invention includes 1) identifying at least one set of words in an electronic document containing sensitive data, the set of words having a low frequency of occurrence in a first collection of electronic documents—e.g., a frequency of occurrence below a predetermined threshold; and, 2) transmitting a query to search a second collection of electronic documents for any electronic document that contains the set of words having a low frequency of occurrence.

This post-facto detection technique does not require pre-leakage knowledge or designation of the data as sensitive since a unique "embedded" signature is identified from within the contents of the document containing the sensitive data. The embedded signature is the set of words in the original document that has a low frequency of occurrence in a first collection of documents. Using a signature from the contents of the original document avoids any need to modify the original document by adding a watermark. The method is also tamper-resistant since any attempt to remove the embedded signature will likely result in a significant change to the original document. This method is versatile in that detection of the set of words that occur with low frequency may be performed on either a statically or a dynamically presented document.

FIG. 1 is a schematic representation of a data detection mechanism according to an aspect of the invention. Various hosts within an enterprise may supply information to a detection engine 101 regarding internal electronic documents containing sensitive data. (An "electronic document" may be any collection of text or characters, with or without non-text/non-character content such as video, images, graphics, links, etc., that may be transmitted electronically. The "electronic document" may or may not be in a form for electronic transmission, such as a collection of binary bits.) This supplying of information may be performed before or after an actual leakage has occurred. Examples of such hosts within an enterprise are a server 102 and end-users' personal computers 103. Sensitive information may be any data which an organization considers to be privileged and confidential.

The detection engine then may perform a function which selects a set of words within an identified electronic document determined to contain sensitive data. In this embodiment, the set of words is a consecutive set of words comprising two or more words. A query containing this set of words may be sent out of an enterprise's firewall 104 to another enterprise 105 which has access to a first collection of electronic documents. An example of the enterprise 105 is the Linguistic Data Consortium (LDC), which is an organization which maintains a collection of Internet web pages as well as a database of frequency of occurrence of collections of consecutive words in these web pages. In an alternative embodiment, a database of frequency of occurrence of sets of words may be used in lieu of or in addition to accessing the collection of first electronic documents.

This process of querying for various sets of words in the electronic document containing sensitive data may be repeated multiple times. A goal of this querying is to determine at least one set of words which appear in the electronic document which contains sensitive data but appears in the first collection of electronic documents with a low frequency. A low frequency may be defined as a frequency below a predetermined threshold. Alternatively, a low frequency may be less than one appearance in every 500 or 1,000 documents.

Only one set of words having a low frequency of occurrence in the first collection of electronic documents may be selected. Alternatively, two or more sets may be identified. When a group of two or more rarely occurring sets of words are identified, one or more sets may be selected by using a function which randomly selects sets of words from the larger group of rarely occurring sets of words. This further enhances the difficulty of defeating the technique by identifying the signature selected. The function used to select the sets of words that are used as a signature may additionally be "secret". For example, the function can include a random number generator which is used to select randomly from amongst a group of potential signatures the word or words that will actually be used as a signature The selected set of low frequency words may be stored for later retrieval, as appropriate.

The random selection of a sub-group from the overall group of infrequently occurring sets of words is helpful in making the post-leakage detection mechanism tamper-resistant. Even if a malicious party tampers a sensitive document and presents a modified version, for example on the Internet, the document can still be uniquely identifiable by the randomly chosen sub-group. Since the sub-group is randomly chosen based on a random selection or a secret function, a malicious party would necessarily have to tamper with a large portion of the document to affect every rarely occurring set of words to make the copied document unidentifiable.

When at least one rarely occurring set of words is identified, the detection engine may then transmit a query across a firewall 104 to an enterprise 106 which maintains a second collection of electronic documents. An example of an enterprise which maintains the second collection of electronic documents is an operator of an Internet search engine. The second collection of electronic documents may be a set of Internet web pages. The second collection of electronic documents may be similar or different than the first collection of electronic documents. In this embodiment, they are different.

The present invention does not require a complete, local copy of all the Internet web pages in order to identify duplicate copies. Rather, in the present invention, only a copy of the electronic document containing sensitive data needs to be maintained within an enterprise in order to construct the embedded signature. The current invention may also include using an embedded signature to query existing search engines to determine duplicate (or near-identical) copies of the electronic document, thus circumventing the need to maintain a complete copy of all the Internet web pages locally.

Alternative embodiments of the current invention Include processing a document by removing all the unwanted features. For example, if the document is in the form of webpages, we may convert the document into ascii. If consecutive words are used, preferably they should be in a single paragraph. Similarly, they should be in a single frames, tables etc. So it is advantageous to break frames into different paragraphs. Additionally, symbols that are ignored in search engines may similarly be ignored in selecting an embedded signature according to the present invention.

The detection engine may receive information regarding whether the second collection of electronic documents contains any document which contains at least one rarely occurring set of words. If at least one such document is identified, this document may be subsequently examined to determine if it represents a replicate or a near replicate of the sensitive data contained in the first electronic document.

Figure 2:
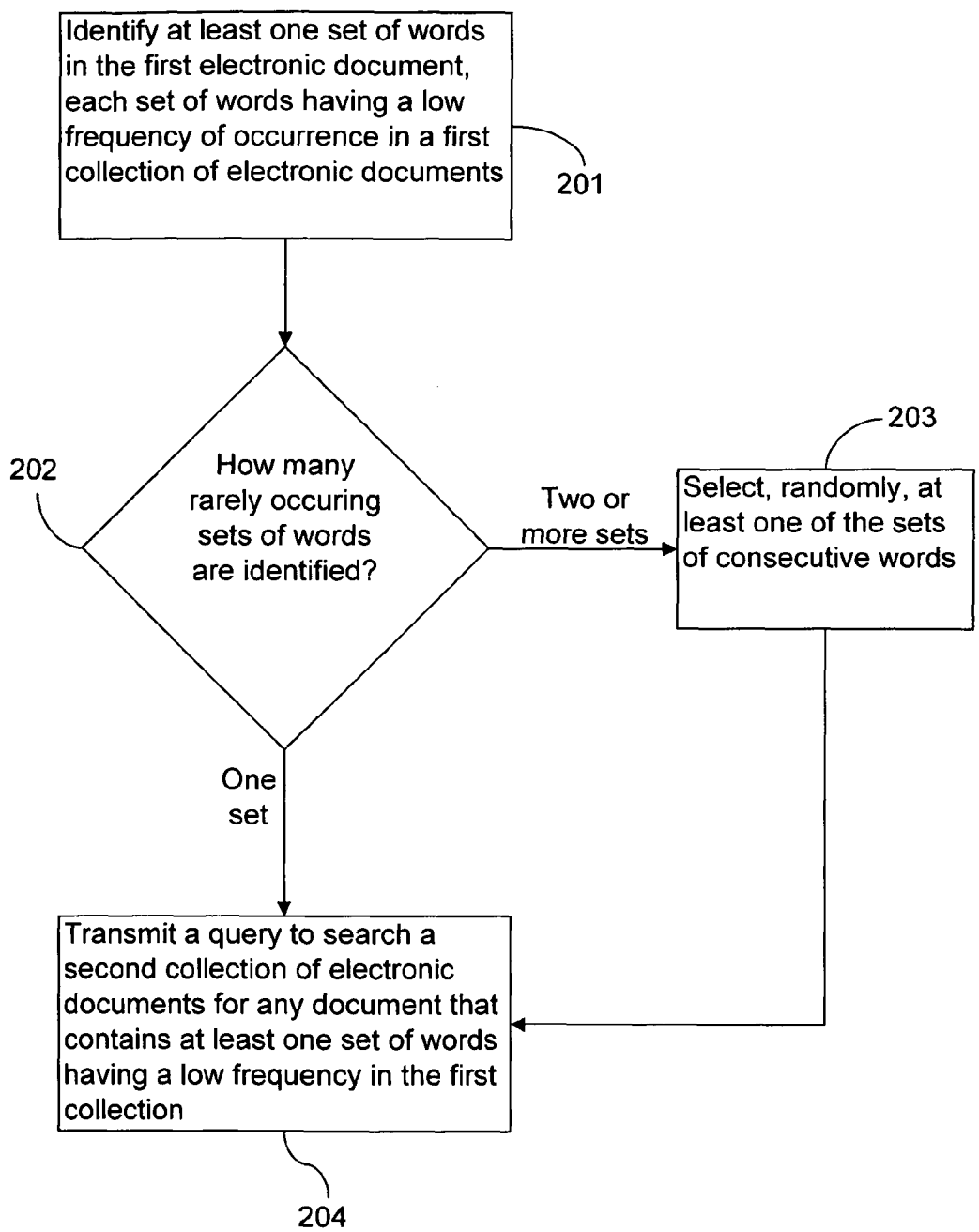
FIG. 2 is a flowchart which is used to illustrate a method of data detection according to an aspect of the invention.

FIG. 2 is a flowchart which is used to illustrate a method of data detection according to an aspect of the invention. In this aspect of the invention, an enterprise or individual which owns an electronic document containing sensitive data wishes to monitor a collection of electronic documents for the presence of the sensitive data, either in its original form or in a somewhat altered form. An example would be an enterprise that suspects that an unauthorized replication or near replication was made of the sensitive document and is being presented in a public domain.

Step 201 involves identifying, in an electronic document containing sensitive data, at least one set of words having a low frequency of occurrence in a first collection of electronic documents. Selecting sets of words in the first document having a low frequency of occurrence in the first collection of electronic documents enhances the effectiveness of a search for the first document. Any other document which contains the at least one set of low frequency of occurrence words has good probability of being linked in some way to the original document containing the sensitive data.

At step 202, it is determined how many rarely occurring sets of words are identified. If only one rarely occurring set of words is identified, then the method continues at step 204. However, if two or more rarely occurring sets of words are identified, then the method continues at step 203. At step 203, a function is used to randomly select a sub-group of sets of words. The function may be secret or may simply be a random selection algorithm. The sub-group may be any number of sets of words from one individual set up to one set less than the total number of rarely occurring sets of words found. The method continues at step 204.

At step 204, a query is transmitted to search a second collection of electronic documents for any document that contains at least one set of words having a low frequency of occurrence in the first collection. In this embodiment, the enterprise which performs the search of the second collection of electronic documents is different than the enterprise owning the first electronic document. Also in this embodiment, the enterprise performing the search has access to, and perhaps temporary control of, the second collection of electronic documents while performing the search. The frequency of occurrence data and/or the first collection of electronic documents may reside or be cached in or local to the detection engine and/or may be accessed remotely.

The enterprise performing the search may transmit back to the enterprise owning the first electronic document the finding from the search. If a partial or complete match has been found, the identified document may be analyzed to determine if it is actually a replica or close replica of the first electronic document. A complete match made when the entire group of rarely occurring set or sets of words are found in the located document. A partial match is made when less than the entire group of rarely occurring sets of words is found in the located document.

Some alternatives to the embodiment as described regarding the schematic representation in FIG. 1 are as follows.

A detection engine may receive information regarding documents containing sensitive data within an enterprise through a manual entry, instead of automatically from network entities such as a server or an end-user's personal computer.

Sensitive information may alternatively be defined as information which a network user considers to be privileged and confidential, instead of being defined as what an enterprise considers privileged and confidential.

Instead of a detection engine performing the steps of selecting a set of words and querying an enterprise monitoring a first collection of electronic documents, a different entity—either within the enterprise or external to the enterprise—may perform these steps. The detection engine would then receive the results from the different entity and proceed with transmitting a query containing at least one of the identified set of words.

The set of words in the electronic document containing sensitive data may be any randomly located words in the document, instead of limited to a set of consecutive words.

The set of words may specifically be limited to between two and five words.

As is seen in the embodiment of FIG. 1, the first collection of electronic documents may be a collection of Internet web pages. Alternatively, these documents may be any group of documents accessible to an entity outside of the enterprise which owns the documents.

A first collection of electronic documents, instead of being maintained by the LDC, may be maintained by an operator of an Internet search engine. In another alternative, the enterprise which owns the electronic document containing the sensitive data may maintain the first collection of electronic documents.

When multiple sets of rarely occurring words are identified, the query to a second collection of electronic documents may contain all of the rarely occurring sets of words as opposed to just a selected sub-group of sets of words.

In an alternative embodiment, there is no firewall 104 between a detection engine and the first collection of electronic documents, the second collection of electronic documents, or both collections. This may occur where an enterprise which maintains the detection engine chooses not to utilize a firewall to separate the detection engine from the public domain. Alternatively, this may be due to either or both collections of electronic documents being maintained within the firewall of an enterprise.

Some alternatives to the method illustrated in FIG. 2 are as follows: At step 202, even if two or more "low frequency" sets of words are identified, the entire group of rarely occurring sets of words is used. The method continues at step 204 where a query is transmitted to search a second collection of electronic documents.

Another alternative to the method shown in FIG. 2 is when only one "low frequency" occurring set of words is identified. Instead of proceeding to step 204, an alternative is to reduce the required threshold for what is defined as a "low frequency" occurring set of words. The method then iterates back to step 201 to identify "low frequency" sets of words utilizing the new "low frequency" threshold. At step 202, if only one set of "low frequency" words is found, then an even lower threshold is chosen, and the method again returns to step 201. However, if two or more "low frequency" sets of words are identified utilizing the lower threshold, then the method continues at step 203. The above described method can be implemented on a computer using well-known computer processors, memory units, storage devices, computer software, and other components.

Figure 3:
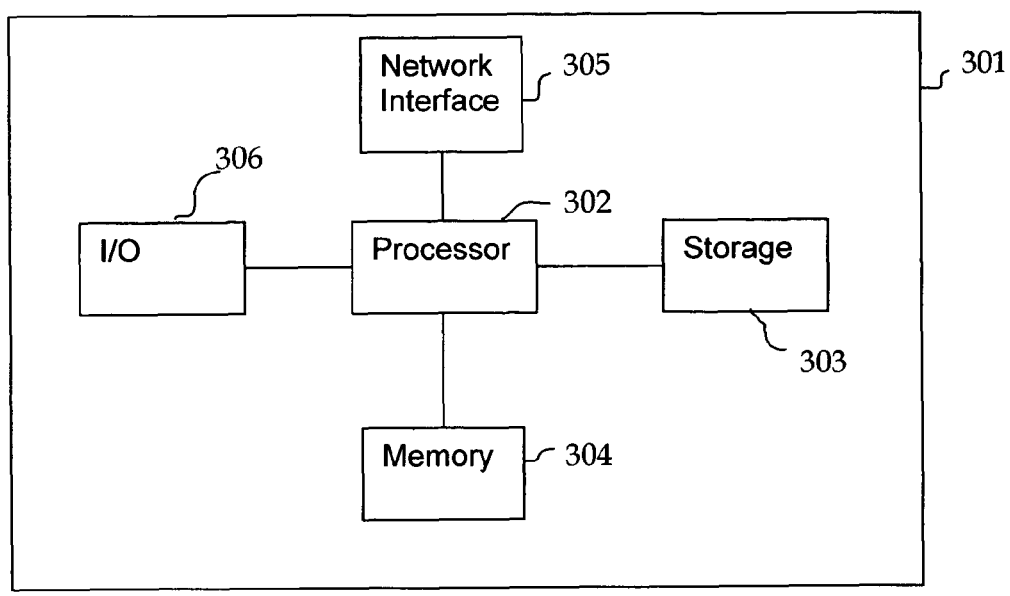
FIG. 3 is a schematic representation of a computer upon which the present invention can be implemented.

A high level block diagram of such a computer is illustrated in FIG. 3. Computer 301 contains a processor 302 which controls the overall operation of the computer 301 by executing computer program instructions which define such operation. The computer program instructions may be stored in a storage device 303 (e.g., magnetic disk) and loaded into memory 304 when execution of the computer program instructions is desired. Thus, the method steps described herein can be defined by the computer program instructions stored in the memory 304 and/or storage 303 and executed by the processor 302. The computer 301 may also include one or more network interfaces 305 for communicating with other devices via a network. The computer 301 also includes input/output devices 306 that enable user interaction with the computer 301 (e.g., display, keyboard, mouse, speakers, buttons, etc.) One skilled in the art will recognize that an implementation of an actual computer could contain other components as well, and that FIG. 3 is a high level representation of some of the components of such a computer for illustrative purpose.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method comprising
identifying at least two sets of consecutive words in a first electronic document, each set of consecutive words having a frequency of occurrence in a first collection of electronic documents that is below a predetermined threshold;
randomly selecting at least one of the sets of consecutive words as a signature; and
transmitting a query comprising the signature to search a second collection of electronic documents for an electronic document that contains the signature.

2. The computer-implemented method of claim 1 wherein a first party transmits the query to a second party that has access to the second collection of electronic documents.

3. The computer-implemented method of claim 2 wherein the second party is an enterprise maintaining an internet search engine.

4. The computer-implemented method of claim 1 wherein the signature comprises more than one word and less than six words.

5. The computer-implemented method of claim 1 wherein the first collection of electronic documents is different than the second collection of electronic documents.

6. The computer-implemented method of claim 1 wherein the first collection of electronic documents is the same as the second collection of electronic documents.

7. The computer-implemented method of claim 1 wherein the first collection of electronic documents is a collection of internet web pages searchable using a repository of occurrences of word frequency on a public internet.

8. The computer-implemented method of claim 1 wherein the predetermined threshold is one in five hundred documents.

9. The computer-implemented method of claim 1 wherein the predetermined threshold is one in a thousand documents.

10. The computer-implemented method of claim 1 wherein the second collection of electronic documents comprises a web page.

11. An apparatus comprising:
means for identifying at least two sets of consecutive words in a first electronic document, each set of consecutive words having a frequency of occurrence in a first collection of electronic documents that is below a predetermined threshold;
means for randomly selecting at least one of the sets of consecutive words as a signature; and
means for transmitting a query comprising the signature to search a second collection of electronic documents for an electronic documents that contains the signature.

12. The apparatus of claim 11, wherein the first collection of electronic documents is different than the second collection of electronic documents.

13. The apparatus of claim 11, wherein the first collection of electronic documents is the same as the second collection of electronic documents.

14. The apparatus of claim 11, wherein the signature comprises more than one word and less than six words.

15. The apparatus of claim 11, wherein the first collection of electronic documents is a collection of internet web pages searchable using a repository of occurrences of word frequency on a public internet.

16. A computer-readable storage medium encoded with computer executable instructions defining steps comprising:
identifying at least two sets of consecutive words in a first electronic document, each set of consecutive words having a frequency of occurrence in a first collection of electronic documents that is below a predetermined threshold;
randomly selecting at least one of the sets of consecutive words as a signature; and
transmitting a query including the signature to search a second collection of electronic documents for an electronic documents that contains the signature.

17. The computer-readable storage medium of claim 16, wherein the predetermined threshold is one in five hundred documents.

18. The computer-readable storage medium of claim 16, wherein the predetermined threshold is one in a thousand documents.

19. The computer-readable storage medium of claim 16, wherein the signature comprises more than one word and less than six words.

20. The computer-readable storage medium of claim 16, wherein the first collection of electronic documents is a collection of internet web pages searchable using a repository of occurrences of word frequency on a public internet.

* * * * *